United States Patent
Umeda et al.

(10) Patent No.: US 6,375,862 B1
(45) Date of Patent: Apr. 23, 2002

(54) FERRITE SINTERED COMPACT

(75) Inventors: Hidenobu Umeda; Taku Murase; Isao Kanada; Tatsuya Shimazaki, all of Tokyo (JP)

(73) Assignee: TDK Corporation, Tokyo (JP)

( * ) Notice: Subject to any disclaimer, the term of this patent is extended or adjusted under 35 U.S.C. 154(b) by 22 days.

(21) Appl. No.: 09/663,197

(22) Filed: Sep. 18, 2000

(30) Foreign Application Priority Data

Oct. 29, 1999 (JP) ............................................. 11-308957

(51) Int. Cl.[7] .......................... C04B 35/26; C01G 49/00; H01F 1/34; H01F 17/04
(52) U.S. Cl. ................. 252/62.6; 252/62.64; 252/62.62
(58) Field of Search ............................. 252/62.6, 62.64, 252/62.62

(56) References Cited

FOREIGN PATENT DOCUMENTS

JP          10-324564          12/1998

*Primary Examiner*—C. Melissa Koslow
(74) *Attorney, Agent, or Firm*—Oblon, Spivak, McClelland, Maier & Neustadt, P.C.

(57) ABSTRACT

The present invention can provide a MgCuZn-based ferrite sintered compact which is constituted by having as substantial main component compositions 7.5 to 23.0 mole % of magnesium oxide, 7.0 to 20.0 mole % of copper oxide, 19.0 to 24.2 mole % of zinc oxide and 48.5 to 50.3 mole % of ferric oxide, and the average particle diameter of the ferrite sintered compact is in a range of 1.10 to 7.30 $\mu$m while the standard deviation $\sigma$ of the size distribution is in a range of 0.60 to 10.00, resulting in the ferrite sintered compact which has a high impedance with a frequency of not less than 50 MHz and is capable of efficiently cutting of radiant noise by selecting inexpensive materials.

4 Claims, No Drawings

FERRITE SINTERED COMPACT

BACKGROUND OF THE INVENTION

1. Field of the Invention

The present invention relates to a ferrite sintered compact, and more particularly to a ferrite sintered compact capable of cutting unnecessary radiant noise in a high frequency (which may be referred to as "a ferrite sintered compact for absorbing high frequency radiant noise" in some cases).

2. Description of the Prior Art

Recently, with rapid progression of the information communication technology or pervasion of various kinds of electronic components, there has been a problem that unnecessary electromagnetic noise adversely affects the various electronic devices.

In general, ferrite is used for an EMI (electromagnetic interference) measure for cutting the unnecessary radiant noise of a target frequency by using an impedance characteristic. The impedance of the ferrite is constituted by a complex ratio permeability, and the impedance per one turn is represented by the following expression.

$$Z = \mu'' A\omega + i\mu' A\omega$$

(Z: impedance, $\mu'$: real part of the complex ratio permeability, $\mu''$: imaginary part of the complex ratio permeability, A: geometric factor of a magnetic body, $\omega$: angular frequency).

In particular, since a frequency of a base clock is not less than 55 MHz and a clock frequency of a CPU is not less than 450 MHz, a frequency band to be emphasized when the ferrite is used for the EMI measure is 50 to 1000 MHz. Therefore, the high impedance is required from approximately 50 MHz in the ferrite.

As the prior art ferrite capable of cutting off the unnecessary radiant noise in such a high frequency, NiCuZn ferrite has been used.

The NiCuZn ferrite having the above-described characteristic, however, has such a problem as that an inexpensive ferrite sintered compact can not be provided since an NiO material is expensive. There is the move such that the MgCuZn ferrite or the MnMgCuZn ferrite using $Mg(OH)_2$, MgO or $MgCO_3$ which is cheaper than the NiO material is manufactured and the thus obtained product is utilized as the ferrite sintered compact capable of cutting off the unnecessary radiant noise in the high frequency. As a prior art technique concerning such a ferrite sintered compact, for example, Japanese patent gazette No. 2727403 and Japanese patent application laid-open No. 324564-1998 can be cited.

However, the capability for cutting off the radiant noise cannot be satisfactory even if the proposed technique according to the above gazette is used as it is, and a desired characteristic to reach a level that the present inventors intend is not obtained.

For example, in the technique disclosed in Japanese patent gazette No. 2747403 and Japanese patent application laid-open No. 324564-1998, an initial permeability is used as a reference for a method for controlling the impedance. However, when using the MgCuZn ferrite or the MnMgZn ferrite substituting Mn or Cu as described in an article, Journal of the Japan Society of Powder and Powder Metallurgy 42 (1995), 22 and another article, Journal of the Japan Society of Powder and Powder Metallurgy 43 (1996), 1399, since a relaxation phenomenon, i.e., reduction in the initial permeability involved by increase in the frequency occurs, the impedance of a high frequency can not necessarily be controlled with the initial permeability.

As described above, the impedance of the ferrite is constituted by a complex ratio permeability and the complex ratio permeability is substantially affected by the magnetization spin and the domain wall displacement. Therefore, it is considered that a parameter concerning the magnetization spin and the domain wall displacement must be found to be controlled in order to efficiently cut off the radiant noise.

Additionally, as described above, the impedance of the ferrite has not only the complex ratio permeability but also an advantage of a magnetic body shape. Thus, in order to value a ferrite sintered compact for efficiently cutting off the radiant noise, it can be considered that measuring the complex ratio permeability as a material constant which is not affected by the shape is preferable.

The present invention is made under such actuality and an object thereof is to provide a ferrite sintered compact which can have a high impedance with a frequency of not less than 50 MHz by selecting an inexpensive material and efficiently cut off radiant noise.

SUMMARY OF THE INVENTION

In order to solve such a problem, the present invention provides an MgCuZn-based ferrite sintered compact constituted by using 7.5 to 23.0 mole % magnesium oxide, 7.0 to 20.0 mole % of copper oxide, 19.0 to 24.2 mole % of zinc oxide, and 48.5 to 50.3 mole % of ferric oxide as substantially main component compositions, wherein an average particle diameter of the ferrite sintered compact is in a range of 1.10 to 7.30 $\mu$m and a standard deviation $\sigma$ of a size distribution is in a range of 0.60 to 10.0.

As a preferable mode, the ferrite sintered compact according to the present invention is constituted such that a real part $\mu'$ of a complex permeability is not less than 85 and an imaginary part $\mu''$ of the complex permeability is not more than 170 with a frequency of 30 MHz and a temperature of 25° C.; the real part $\mu'$ of the complex permeability is not less than 45 and the imaginary part $\mu''$ of the complex permeability is not less than 100 with a frequency of 50 MHz and a temperature of 25° C.; and the real part $\mu'$ of the complex permeability is not less than −1.8 and the imaginary part $\mu''$ of the complex permeability is not less than 16 with a frequency of 500 MHz and a temperature of 25° C.

As another preferred mode, the ferrite sintered compact according to the present invention is constituted such that a real part $\mu'$ of a complex permeability is not less than 15 and an imaginary part $\mu''$ of the complex permeability is not less than 71 with a frequency of 100 MHz and a temperature of 25° C.; and the real part $\mu'$ of the complex permeability is not less than −0.3 and the imaginary part $\mu''$ of the complex permeability is not less than 27 with a frequency of 300 MHz and a temperature of 25° C.

As still another preferred mode, the ferrite sintered compact according to the present invention is constituted in such a manner that it is fired at a firing temperature of less than 1200° C.

DETAILED DESCRIPTION OF THE PRESENT INVENTION

A ferrite sintered compact according to the present invention will now be described in detail hereinafter. The sintered compact according to the present invention relates to a ferrite sintered compact capable of cutting off unnecessary radiant noise in a high frequency and 50 to 1000 MHz in particular. In other words, it relates to a ferrite sintered compact whose impedance is suddenly increased from near 50 MHz and which can have a high impedance in 50 to 1000 MHz.

In regard to the substantial main component compositions of the ferrite sintered compact according to the present invention, the present invention provides an MgCuZn-based ferrite sintered compact which contains 7.5 to 23.0 mole % of magnesium oxide, 7.0 to 20.0 mole % of copper oxide, 19.0 to 24.2 mole % of zinc oxide, and 48.5 to 50.3 mole % of ferric oxide as material compositions. A further preferable range of these main component compositions is 7.5 to 17.3 mole % of magnesium oxide, 15.0 to 20.0 mole % of copper oxide, 20.0 to 23.5 mole % of zinc oxide and 49.2 to 49.6 mole % of ferric oxide.

In the ferrite sintered compact according to the present invention, the fine structure of this sintered compact is set as follows. That is, the average particle diameter is set to 1.10 to 7.30 μm and a standard deviation σ of a size distribution is set in a range of 0.60 to 10.00. These values can be obtained by the following procedure. That is, 300 polycrystalline particles which can be observed by an optical microscope are taken out as a population and converted into values of diameters corresponding to a circle. Then, these converted values are used to calculate an average of diameters (average diameter) and the standard deviation σ, respectively. The standard deviation σ is defined as follows:

$$\sigma = \sqrt{\frac{1}{n-1}\sum_{i=1}^{n}(x_i - \bar{x})^2}$$

In this equation, n denotes the number of data, $\bar{x}$ denotes the average value of data, and $x_i$ denotes i order value of x.

In the MgCuZn-based ferrite sintered compact according to the present invention, by setting the fine structure after firing and a composition range as described above, magnetization spin and a domain wall displacement can be controlled, and frequency characteristics of the real part and the imaginary part of the complex ratio permeability intended by the present invention can be obtained, thereby having a high impedance in 50 to 1000 MHz.

It is to be noted that the impedance of the ferrite is constituted by the complex ratio permeability as described above and the impedance per one turn can be represented by the following expression.

$$Z = \mu''A\omega + i\mu'A\omega$$

In this expression, Z represents an impedance; $\mu'$, a real part of a complex ratio permeability; $\mu''$, an imaginary part of the complex ratio permeability; A, a geometric factor of a magnetic body; and ω, an angular frequency.

In the above composition range, if an amount of zinc oxide deviates from the above setting range, the imaginary part $\mu''$ of the complex ratio permeability tends to be lowered, and a Curie point also tends to be reduced. Reduction in the Curie point is not preferable since it may cause heat generation to produce the characteristic deterioration which can lead to the so-called thermal runaway.

When an amount of zinc oxide is beyond the above setting range, the real part $\mu'$ of the complex ratio permeability and the imaginary part $\mu''$ of the complex ratio permeability tend to be lowered, and a Curie point also tends to be reduced.

Similarly, when an amount of ferric oxide deviates from the above setting range, the real part $\mu'$ of the complex ratio permeability and the imaginary part $\mu''$ of the complex ratio permeability tend to be lowered, and a Curie point also tends to be reduced.

It is to be noted that magnesium oxide maintains proportions of other components and plays an expletive role.

When the average particle diameter in the ferrite sintered compact according to the present invention deviates from the above-described range of 1.10 to 7.30 μm or when the standard deviation σ of the size distribution is beyond the above-mentioned range of 0.60 to 10.00, target frequency characteristics of the real part $\mu'$ of the complex ratio permeability and the imaginary part $\mu''$ of the complex ratio permeability can not be obtained, and there occurs a disadvantage such as that a high impedance can be obtained in 50 to 1000 MHz.

Further, the impedance characteristic that the ferrite sintered compact according to the present invention has is described as follows.

(1) The real part $\mu'$ of the complex permeability is not less than 85 and the imaginary part $\mu''$ of the complex permeability is not more than 170 with a frequency 30 MHz and a temperature of 25° C. With a frequency of 30 MHz, a signal must be passed, and $\mu''$ which is a loss component must hence be suppressed.

(2) The real part $\mu'$ of the complex permeability is not less than 45 and the imaginary part $\mu''$ of the complex permeability is not less than 100 with a frequency of 50 MHz and a temperature of 25° C. This characteristic is given for the purpose of enabling provision of a high impedance in 50 to 1000 MHz and cutoff of unnecessary radiant noise with the following requirement in (3).

(3) The real part $\mu'$ of the complex permeability is not less than −1.8 and the imaginary part $\mu''$ of the complex permeability is not less than 16 with a frequency of 500 MHz and a temperature of 25° C. This characteristic is given for the purpose of enabling provision of a high impedance in 50 to 1000 MHz and cutoff of unnecessary radiant noise with the above requirement in (2).

If the above characteristics (1) to (3) are given, the present invention can satisfactorily demonstrate the advantage, but the following (4) and (5) are listed as confirmative requirements by way of caution. It is to be noted that the experiment conducted by the present inventors has confirmed that the following requirements of (4) and (5) can be necessarily satisfied if the above requirements of (1) to (3) are met.

(4) The real part $\mu'$ of the complex permeability is not less than 15 and the imaginary part $\mu''$ of the complex permeability is not less than 71 with a frequency of 100 MHz and a temperature of 25° C.

(5) The real part $\mu'$ of the complex permeability is not less than −0.3 and the imaginary part $\mu''$ of the complex permeability is not less than 27 with a frequency of 300 MHz and a temperature of 25° C.

In order to manufacture the ferrite sintered compact according to the present invention, a firing temperature is less than 1200° C., and sinter is carried out at a temperature of 980 to 1100° C. in particular. When the MgCuZn ferrite which is in the above-described composition range is fired at a temperature of not less than 1200° C., the target frequency characteristics of the real part $\mu'$ of the complex ratio permeability and the imaginary part $\mu''$ of the complex ratio permeability can not be obtained, and there occurs a problem such as that the high impedance can not be provided in 50 to 1000 MHz. In particular, since a temperature of not less than 1200° C. exceeds a fusing point of CuO, a liquid phase is generated, which results in the abnormal grain growth and production of a large amount of segregated substances. Further, as the firing temperature increases, segregation of Mg which diffuses at a high speed can be easily generated as a non-magnetic phase. Therefore, even if the composition range is in the range of this application, the above-described fine structure of the present invention can not be obtained, and the magnetization spin and the domain wall displacement can not be controlled.

The MgCuZn ferrite sintered compact according to the present invention may contain one, two or more kinds of MnO, CaO, CoO; NiO, $SiO_2$, $TiO_2$, $HfO_2$, $GeO_2$, $ZrO_2$, $MoO_3$, $WO_3$, $Bi_2O_3$, $In_2O_3$, $Cr_2O_3$, $Al_2O_3$, $Ta_2O_5$, $Nb_3O_5$, $V_3O_5$ and others at a rate of not more than 1 wt % as well as the above-mentioned components.

The present invention will now be described in detail hereinafter in conjunction with a specific embodiment.

As shown in Table 1, after compounding predetermined amounts of MgO, CuO, ZnO and $Fe_2O_3$, these materials were wet-mixed by a steel ball mill for approximately 15 hours. The mixed powder was further calcinated at 900° C. for 2 hours and then wet-milled by the steel ball mill for 15 hours. 10 wt % of poly vinyl alcohol solution was added to the obtained ferrite powder to be granulated, and this mixture was formed into a cylindrical shape having an external diameter of 15 mm, an internal diameter of 7 mm and a height of 18 mm by a pressure of 1 ton/cm². The thus formed compact was fired for 3 hours at a firing temperature shown in Table 1 in the atmosphere to manufacture various ferrite sintered compact samples.

For each obtained sample, (1) a value of the real part $\mu'$ and a value of the imaginary part $\mu''$ of the complex ratio permeability in each of frequencies 30 MHz, 50 MHz, 100 MHz, 300 MHz and 500 MHz, (2) an average crystalline particle diameter, (3) a standard deviation C of a size distribution and (4) a Curie point were obtained.

The results are shown in Table 1.

Incidentally, it was confirmed that that an impedance value which is nearly equal to that of a target NiCuZn-based ferrite sintered compact can be obtained from the ferrite sintered compact according to the present invention as described above. That is, in the MgCuZn-based ferrite according to the present invention containing 7.5 to 17.3 mole % of MgO, 15.0 to 20.0 mole % of CuO, 20.0 to 23.5 mole % of ZnO and 49.2 to 49.6 mole % of $Fe_2O_3$, respective impedance values of 92.0 to 93.5Ω (30 MHz), 108.6 to 124.7Ω (50 MHz), 133.5 to 151.1Ω (100 MHz), 153.6 to 181.3Ω (300 MHz), 156.6 to 188.6Ω (500 MHz) were obtained. The respective impedance values are at the same level as values of 101.6Ω (30 MHz), 124.4Ω (50 MHz), 150.6Ω (100 MHz), 158.3Ω (300 MHz) and 165.6Ω (500 MHz) in the target NiCuZn-based ferrite sintered compact.

TABLE 1

| | Composition | | | Firing Temperature | 30 MHz | | 50 MHz | | 100 MHz | | 300 MHz | | 500 MHz | | Fine Structure | | Curie Temperature |
| | MgO | CuO | ZnO | Fe$_2$O$_3$ | (° C.) | μ' | μ" | μ' | μ" | μ' | μ" | μ' | μ" | μ' | μ" | Average Particle Diameter (μm) | Standard Deviation σ | (° C.) |
|---|---|---|---|---|---|---|---|---|---|---|---|---|---|---|---|---|---|---|
| Embodiment 1 | 21.0 | 9.0 | 21.0 | 49.0 | 1060 | 93.7 | 146.0 | 59.8 | 114.0 | 24.3 | 73.5 | 1.1 | 30.0 | -1.4 | 18.0 | 5.41 | 3.11 | 171 |
| Embodiment 2 | 20.7 | 9.0 | 21.0 | 49.3 | 1060 | 92.9 | 147.0 | 59.9 | 114.0 | 24.4 | 73.9 | 1.0 | 30.1 | -1.5 | 18.0 | 4.93 | 3.19 | 175 |
| Embodiment 3 | 20.5 | 9.0 | 21.0 | 49.5 | 1060 | 96.6 | 141.0 | 62.9 | 112.0 | 25.4 | 74.1 | 1.0 | 30.0 | -1.4 | 18.0 | 5.29 | 2.95 | 175 |
| Embodiment 4 | 20.0 | 9.0 | 21.0 | 50.0 | 1060 | 99.6 | 138.0 | 64.2 | 108.0 | 27.6 | 71.9 | 1.8 | 30.9 | -1.5 | 18.5 | 2.88 | 1.96 | 177 |
| Embodiment 5 | 22.7 | 7.0 | 21.0 | 49.3 | 980 | 85.3 | 146.6 | 54.2 | 110.0 | 23.8 | 71.2 | 1.5 | 30.2 | -1.4 | 18.1 | 1.73 | 0.93 | 156 |
| Embodiment 6 | 15.7 | 14.0 | 21.0 | 49.3 | 980 | 97.3 | 149.0 | 59.1 | 109.0 | 27.7 | 72.4 | 3.0 | 32.8 | -1.2 | 20.3 | 2.28 | 1.54 | 191 |
| Embodiment 7 | 12.7 | 17.0 | 21.0 | 49.3 | 980 | 108.0 | 142.0 | 64.7 | 107.0 | 30.7 | 72.6 | 3.6 | 33.8 | -1.1 | 21.0 | 2.76 | 1.64 | 202 |
| Embodiment 8 | 9.7 | 20.0 | 21.0 | 49.3 | 1020 | 119.0 | 133.0 | 70.7 | 105.0 | 33.6 | 73.0 | 4.3 | 34.9 | -0.9 | 21.8 | 3.45 | 2.13 | 210 |
| Embodiment 9 | 22.7 | 9.0 | 19.0 | 49.3 | 1020 | 97.7 | 143.0 | 63.2 | 112.0 | 27.0 | 73.5 | 1.6 | 30.9 | -1.5 | 18.7 | 4.54 | 2.79 | 199 |
| Embodiment 10 | 7.5 | 19.4 | 23.3 | 49.8 | 1020 | 126.0 | 148.0 | 81.0 | 123.0 | 32.0 | 81.0 | 1.8 | 33.5 | -1.6 | 20.3 | 7.04 | 9.98 | 189 |
| Embodiment 11 | 17.3 | 12.0 | 21.5 | 49.2 | 1020 | 97.2 | 152.9 | 59.6 | 117.0 | 23.1 | 74.2 | 1.0 | 30.0 | -1.5 | 18.0 | 6.03 | 3.65 | 172 |
| Embodiment 12 | 14.3 | 15.0 | 21.5 | 49.2 | 1020 | 108.0 | 151.0 | 66.2 | 118.0 | 26.5 | 76.4 | 1.4 | 31.4 | -1.6 | 19.0 | 6.23 | 3.59 | 183 |
| Embodiment 13 | 11.3 | 18.0 | 21.5 | 49.2 | 1020 | 116.0 | 142.0 | 70.0 | 114.0 | 29.2 | 75.9 | 2.0 | 32.1 | -1.5 | 19.5 | 4.83 | 3.43 | 190 |
| Embodiment 14 | 20.7 | 9.0 | 21.0 | 49.3 | 1020 | 92.9 | 147.0 | 59.9 | 114.0 | 24.4 | 73.9 | 1.0 | 30.2 | -1.5 | 18.0 | 4.48 | 2.26 | 170 |
| Embodiment 15 | 20.2 | 9.0 | 21.0 | 49.8 | 1020 | 89.5 | 148.0 | 58.0 | 113.0 | 24.5 | 73.0 | 1.1 | 30.3 | -1.5 | 18.1 | 4.71 | 2.38 | 174 |
| Embodiment 16 | 19.7 | 9.0 | 21.0 | 50.3 | 1060 | 96.0 | 142.0 | 60.4 | 108.0 | 26.2 | 71.1 | 1.9 | 30.5 | -1.5 | 18.4 | 1.24 | 0.64 | 177 |
| Embodiment 17 | 18.6 | 8.2 | 24.0 | 49.2 | 1060 | 85.4 | 167.0 | 48.7 | 124.0 | 15.8 | 72.8 | -0.1 | 27.1 | -1.8 | 16.4 | 5.68 | 3.68 | 145 |
| Embodiment 18 | 17.7 | 9.0 | 24.0 | 49.3 | 1060 | 86.2 | 139.0 | 53.7 | 107.0 | 21.3 | 71.2 | 1.5 | 27.2 | -0.9 | 16.7 | 6.12 | 3.57 | 148 |
| Comparative Embodiment 1 | 22.0 | 9.0 | 21.0 | 48.0 | 1100 | 86.2 | 139.0 | 53.7 | 107.0 | 21.3 | 67.4 | 1.5 | 26.7 | -0.9 | 15.8 | 4.02 | 2.32 | 155 |

TABLE 1-continued

| | Composition | | | | Firing Temperature | 30 MHz | | 50 MHz | | 100 MHz | | 300 MHz | | 500 MHz | | Fine Structure | | Curie Temperature |
| | MgO | CuO | ZnO | Fe₂O₃ | (°C.) | μ' | μ" | μ' | μ" | μ' | μ" | μ' | μ" | μ' | μ" | Average Particle Diameter (μm) | Standard Deviation σ | (°C.) |
|---|---|---|---|---|---|---|---|---|---|---|---|---|---|---|---|---|---|---|
| Comparative Embodiment 2 | 19.5 | 9.0 | 21.0 | 50.5 | 1180 | 113.0 | 88.6 | 81.3 | 87.1 | 33.8 | 70.5 | 1.5 | 29.0 | −0.8 | 17.8 | 98.64 | 79.82 | 177 |
| Comparative Embodiment 3 | 23.2 | 9.0 | 18.5 | 49.3 | 980 | 81.8 | 139.0 | 50.3 | 98.5 | 25.9 | 64.3 | 4.0 | 30.8 | −0.7 | 19.5 | 2.03 | 1.33 | 202 |
| Comparative Embodiment 4 | 23.2 | 6.5 | 21.0 | 49.3 | 1060 | 83.5 | 146.3 | 52.6 | 108.3 | 22.9 | 70.0 | 1.6 | 29.7 | −1.4 | 18.0 | 5.75 | 3.86 | 152 |
| Comparative Embodiment 5 | 24.0 | 6.0 | 22.0 | 48.0 | 1200 | 84.4 | 116.0 | 52.7 | 92.6 | 21.2 | 60.0 | 2.0 | 24.9 | −0.5 | 15.3 | 7.37 | 4.91 | 143 |
| Comparative Embodiment 6 | 20.0 | 9.0 | 21.0 | 50.0 | 1020 | 94.3 | 125.0 | 55.1 | 93.8 | 26.8 | 62.5 | 3.9 | 39.8 | −0.6 | 18.9 | 1.09 | 0.6 | 177 |
| Comparative Embodiment 7 | 20.0 | 9.0 | 21.0 | 50.0 | 1100 | 117.0 | 109.0 | 77.3 | 99.0 | 31.3 | 72.0 | 1.6 | 29.8 | −0.8 | 18.0 | 7.89 | 6.05 | 177 |
| Comparative Embodiment 8 | 20.0 | 9.0 | 21.0 | 50.0 | 1140 | 122.0 | 80.7 | 88.8 | 83.3 | 37.8 | 72.0 | 2.6 | 30.5 | −0.4 | 19.0 | 209.5 | 165.1 | 177 |
| Comparative Embodiment 9 | 19.3 | 7.0 | 24.7 | 49.0 | 1120 | 74.7 | 165.0 | 40.2 | 119.0 | 12.7 | 67.2 | 0.1 | 25.1 | −1.5 | 15.2 | 5.63 | 3.87 | 116 |

The advantages of the present invention are apparent from the above-described results. That is, the present invention can provide a MgCuZn-based ferrite sintered compact which is constituted by having as substantial main component compositions 7.5 to 23.0 mole % of magnesium oxide, 7.0 to 20.0 mole % of copper oxide, 19.0 to 24.2 mole % of zinc oxide and 48.5 to 50.3 mole % of ferric oxide, and the average particle diameter of the ferrite sintered compact is in a range of 1.10 to 7.30 μm while the standard deviation σ of the size distribution is in a range of 0.60 to 10.00, resulting in the ferrite sintered compact which has a high impedance with a frequency of not less than 50 MHz and is capable of efficiently cutting of radiant noise by selecting inexpensive materials.

What is claimed is:

1. A ferrite sintered compact containing MgCuZn, which is constituted by having as substantial main component compositions 7.5 to 23.0 mole % of magnesium oxide, 7.0 to 20.0 mole % of copper oxide, 19.0 to 24.2 mole % of zinc oxide and 48.5 to 50.3 mole % of ferric oxide, wherein an average particle diameter of said ferrite sintered compact is in a range of 1.10 to 7.30 μm and a standard deviation σ of a size distribution of the same is in a range of 0.60 to 10.00.

2. The ferrite sintered compact according to claim 1, wherein a real part $\mu'$ of a complex permeability is not less than 85 and an imaginary part $\mu''$ of said complex permeability is not more than 170 with a frequency of 30 MHz and a temperature of 25° C.;

a real part $\mu'$ of a complex permeability is not less than 45 and an imaginary part $\mu''$ of said complex permeability is not less than 100 with a frequency of 50 MHz and a temperature of 25° C.; and a real part $\mu'$ of a complex permeability is not less than −1.8 and an imaginary part $\mu''$ of said complex permeability is not less than 16 with a frequency of 500 MHz and a temperature of 25° C.

3. The ferrite sintered compact according to claim 2, wherein a real part $\mu'$ of a complex permeability is not less than 15 and an imaginary part $\mu''$ of said complex permeability is not less than 71 with a frequency of 100 MHz and a temperature of 25° C.; and a real part $\mu'$ of a complex permeability is not less than −0.3 and an imaginary part $\mu''$ of said complex permeability is not less than 27 with a frequency of 300 MHz and a temperature of 25° C.

4. The ferrite sintered compact according to claim 1, wherein said ferrite sintered compact is fired at a firing temperature of less than 1200° C.

* * * * *